United States Patent Office 3,091,569
Patented May 28, 1963

3,091,569
MUCOLYTIC-N-ACYLATED SULFHYDRYL COMPOSITIONS AND PROCESS FOR TREATING ANIMAL MUCUS
Aaron Leonard Sheffner, Evansville, Ind., assignor to Mead Johnson & Company, Evansville, Ind., a corporation of Indiana
No Drawing. Filed Aug. 26, 1960, Ser. No. 52,040
12 Claims. (Cl. 167—58)

This invention relates to a therapeutic composition and process and has for an object the provision of a composition and process for treating animal mucus.

The treatment of pathological disorders in the respiratory system is a well developed medical practice and a number of compositions have been suggested for the treatment of such respiratory diseases as the common cold, allergies, severe bronchitis, and the like. Certain of the heretofore proposed compositions have met with some success, but there is still a wide recognition that the ideal preparation has not been found. For example, it has been discovered in accordance with one embodiment of this invention that an ideal decongestant suitable for use in treating the respiratory system is one which should have marked mucolytic properties. Secondly, the composition should be compatible with other therapeutic agents that may be used in connection therewith, such as vasoconstrictors, vasodilators, antibiotics, sulfa drugs, antihistaminics, enzymes, surfactants and antiseptics. In addition, such agents should be capable of convenient administration as a powder by insufflation, or in solution as in nose drops or as sprays or aerosols.

Accordingly, it is an object of this invention to provide a therapeutic agent which may be readily administered which has a high degree of mucolytic activity and which is compatible with other types of therapeutic agents that may be used in connection therewith.

A further object of this invention is the provision of a process for treating mucus whereby viscosity of the mucus is quickly and markedly reduced.

A still further object of this invention is the provision of a process for contacting mucus on a mucous membrane in an animal whereby the viscosity of the mucus is markedly reduced and decongestion in the treated area is attained.

Further and additional objects will appear from the following description and the accompanying claims.

In accordance with one embodiment of this invention, a process is provided for the treatment of animal mucus which includes the step of contacting the mucus with an N-acylated sulfhydryl compound having the formula

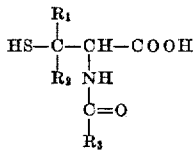

wherein $R_1$ and $R_2$ are each selected from the group consisting of hydrogen and lower alkyl (up to four carbon atoms) and $R_3$ is selected from the group consisting of lower alkyl and phenyl. Specific compounds that are included within the scope of this invention are N-acetylcysteine, N-propionylcysteine, N-caproylcysteine, N-benzoylcysteine, N-acetylpenicillamine, and N-acetyl-β-mercaptoisoleucine. These compounds all contain a sulfhydryl group and a carboxyl group. It will be apparent that the carboxyl group may be partially or completely neutralized by adjustment of pH of the solution to be used for application to the mucous membrane. This pH adjustment is effected by a suitable alkaline-reacting non-toxic substance, such as sodium hydroxide, ammonium hydroxide or the like, and thus the nontoxic salts of the sulfhydryl compounds, such as the salts of sodium, ammonium, calcium, magnesium and the like, together with the nontoxic acid addition salts thereof, are included within the scope of this invention.

This invention finds particular applicability in the treatment of the mucous membrane in animals with the stated compound in order to reduce the viscosity of the mucus on the membrane. As will be apparent from the following description, the invention is particularly useful for decongesting the respiratory and vaginal tracts of animals.

The sulfhydryl compounds of this invention may be prepared by conventional procedures. The following methods may be used:

*N-propionyl-L-cysteine.*—To 35.1 gm. (0.2 mole) L-cysteine hydrochloride (monohydrate in 100 ml. 4 N sodium hydroxide at 0° C. is added, with efficient stirring and under a nitrogen atmosphere, 22.2 gm. propionyl chloride and 60 cc. 4 N sodium hydroxide over a two hour period. The mixture is stirred in the cold an additional two hours and at room temperature for three hours. The mixture is stored in the refrigerator overnight, acidfied with 33.3 ml. 6 N hydrochloric acid and concentrated under reduced pressure at room temperature until solids begin to appear. Ethanol is added and the mixture filtered to remove the insoluble salts. The filtrate is evaporated to an oil which is redissolved in 40 ml. water and passed through a 24" x 2" Dowex 50-X8 (200-400 mesh) column (H+ cycle). The column is eluated with water and that volume giving a positive nitroprusside reaction is collected. The eluate is concentrated under reduced pressure to an oil which after refrigeration for three months gives a crystalline product melting indefinitely (hydroscopic) at 75–80°.

*N-acetyl-L-cysteine.*—A process may be used for the preparation of this compound which is essentially the same as that for the preparation of N-propionyl-L-cysteine described above except that acetic anhydride or acetyl chloride may be substituted for the propionyl chloride. The method of Pirie et al., Biochemical Journal, 27, 1716–18 (1933) may also be used.

*N-caproyl-L-cysteine.*—This product may be employed by the same general method indicated above except that n-caproyl chloride is used as the acylating agent.

*N - benzoyl - L - cysteine.*—L - cysteine hydrochloride (monohydrate) is reacted with benzoyl chloride and sodium hydroxide under general Schotten-Baumann reaction conditions. Upon acidification of the reaction mixture a material is obtained which is contaminated with benzoic acid. Washing with benzene and ether and recrystallization from these solvents gives a final product melting at 105–110°.

*N-acetyl-DL-penicillamine.*—N - acetyl - DL - penicillamine is prepared according to the procedure described by Leach and Hunter, Biochemical Preparations, 3, 111 (1953) by reacting 4-isopropylidiene-2-methyl-5(4)- oxazalone (prepared from N-chloroacetyl-DL-valine) with hydrogen sulfide followed by hydrolysis.

*N - acetyl-β-mercapto-DL-isoleucine.*—N-chloroacetyl-DL-isoleucine is converted to the azlactone with acetic anhydride. Reaction of hydrogen sulfide in sodium methoxide with azlactone followed by hydrolysis gives the N-acetyl-β-mercapto-DL-isoleucine. This is essentially the procedure described by Clark et al., The Chemistry of Penicillin, Princeton University Press, 1949, page 469. The product is probably a mixture of the two racemic pairs. M.P. 143–145°.

In order to demonstrate the mucolytic properties of N-acetylcysteine, small globules of clots of viscous pulmonary secretions were placed on glass slides inclined at an angle of 53°. At this angle the clots did not move on the slide. One half of the globules were contacted with drops of water and one half with drops of aqueous 0.25 M N-acetylcysteine. The globules treated with water retained their rigidity while those treated with the N-acetylcysteine solution immediately collapsed due to loss of viscosity and ran down the slides.

Drops of N-acetylcysteine solution (0.25 M, pH 7.5) were administered intranasally to a young woman with congested sinuses (chronic condition), a young man with congested sinuses and nostrils from a common cold, and a seven-month-old baby girl with severe bronchitis. Immediate clearing of the nostrils and sinuses took place in each instance. In the case of the child, the bronchitis was severe enough to warrant placing her in an oxygen tent; also, the administration of an aerosol containing a commercially available surface active agent had been unsuccessful. The beneficial effect of the N-acetylcysteine solution lasted 2½ to 3 hours in the adults and approximately 45 minutes in the child.

Tests have been made on the other sulfhydryl compounds as defined above and it has been found that they also have mucolytic properties. The N-acylated cysteine compounds which are not substituted in the beta position (i.e. $R_1=R_2=$hydrogen) appear to be more effective than the beta substituted compounds (i.e. $R_1$ and/or $R_2$ equal lower alkyl).

Also in accordance with this invention, a therapeutic composition has been provided which comprises the N-acylated sulfhydryl compound and a pharmaceutical carrier, thereby resulting in a composition which may be used readily in the above indicated process. The pharmaceutical carrier may comprise water, or in the event that it is to be sprayed, may comprise a suitable aerosol propellant, as is well known. Other inert pharmaceutical carriers may be employed, such as lactose, starch, calcium carbonate, cream or jelly base carriers, talc, hydrated alumina or the like, the type of carrier being dependent at least in part upon the type of composition desired and the place and method of its application to the mucus. If desired, the N-acylated compound can be combined with various therapeutic agents which may include (1) vasoconstrictors for reducing mucosal swelling and diminishing the secretion of viscous mucus in the respiratory tract, (2) bronchodilators to aid in the passage of air to the lungs, (3) antibiotics, antiseptics and chemotherapeutic agents to prevent infection and the resultant secretion of purulent fluids, (4) antihistaminics or steroids to reduce allergic and other inflammatory reactions, (5) surfactants, and (6) various enzymes, such as deoxyribonuclease and/or proteolytic enzymes which under certain conditions may supplement the action of the N-acylcysteine.

The N-acylcysteines, and particularly N-acetylcysteine, are particularly useful as mucolytic agents in accordance with this invention since these compounds do not have an obnoxious odor. They do not have a nauseating taste and they are relatively stable to oxidation in aqueous solution. Because of this stability the mucolytic properties of the compounds are retained in compositions containing water, especially in the presence of sodium ethylenediamine tetraacetic acid (EDTA) or other chelating agents, and the compounds do not form a precipitate on standing which could produce irritation in the respiratory tract upon use. The compositions are relatively innocuous and are nontoxic. They can be used as often as required to remove mucus from the respiratory tract or other areas of the body where the presence of the viscous mucus is a clinical problem. For a more complete understanding of this invention, reference will now be made to a number of specific examples showing compositions which may be prepared and used in accordance with this invention but applied to the animal by the usual techniques, as will be understood in the art.

Example 1

An aqueous solution for use in the treatment of the respiratory tract by inhalation has the following composition:

N-acetylcysteine _____gm__ 3.0
Distilled water q.s. ad_____ml__ 100.0
Sodium hydroxide in an amount sufficient to impart pH 7.5 to the solution.

Example 2

An aqueous solution for use in the treatment of the respiratory tract by inhalation containing a chelating agent to increase the stability of the mucolytic agent has the following composition:

N-acetylcysteine _____gm__ 20.0
Sodium EDTA_____gm__ 0.1
Distilled water q.s. ad_____ml__ 100.0
Sodium hydroxide in an amount to impart pH 7.5 to the solution.

Example 3

A composition suitable for inhalation as a powder aerosol from a pressurized container in which the mucolytic agent is present as a micronized powder suspension and in which the aerosol contains the conventional lubricants and excipients and has the following composition:

N-acetylcysteine, sodium salt_____gm__ 1.0
Freon 12_____ml__ 23.0
Freon 14_____ml__ 77.0

Example 4

A composition suitable for intranasal instillation has the following composition:

N-acetylcysteine _____gm__ 10.0
Sodium EDTA_____gm__ 0.1
Cetyl pyridinium chloride (a bacteriological preservative) _____gm__ 0.02
Distilled water q.s. ad_____ml__ 100.0
Sodium hydroxide in an amount to impart pH 7.5 to the solution.

The above preparation may be instilled as drops or spray or by use of nitrogen pressure (nitrosol).

Examples 5 and 6

N-propionylcysteine or N-caproyl-L-cysteine may be substituted for N-acetylcysteine in Example 4.

Example 7

A suitable composition for inhalation containing a bronchodilator has the following composition:

N-acetylcysteine _____gm__ 3.0
Epinephrine hydrochloride_____gm__ 0.1
Sodium EDTA_____gm__ 0.1
Distilled water q.s. ad_____ml__ 100.0
Sodium hydroxide in an amount to impart pH 7.5 to the solution.

Examples 8 and 9

N-propionylcysteine or N-caproyl-L-cysteine may be substituted for N-acetylcysteine in Example 7.

Example 10

A suitable composition containing an antihistaminic for intranasal instillation has the following composition:

N-acetylcysteine _____gm__ 3.00
Chlorpheniramine maleate_____gm__ 0.02
Sodium EDTA_____gm__ 1.10
Distilled water q.s. ad_____ml__ 100.0
Sodium hydroxide in an amount to impart pH 7.5 to the solution.

Examples 11 and 12

N - benzoyl - L-cysteine or N-acetyl-DL-penicillamine may be substituted for N-acetylcysteine in Example 10.

Example 13

A composition containing a vasoconstrictor for intranasal installation has the following composition:

N-acetylcysteine _____gm__ 3.00
Phenylephrine hydrochloride_____gm__ 0.25
Sodium EDTA_____gm__ 0.10
Distilled water q.s. ad_____ml__ 100.00
Sodium hydroxide in an amount to impart pH 7.5 to the solution.

Example 14

N-acetyl-DL-penicillamine may be substituted for N-acetylcysteine in Example 13.

Example 15

A composition containing an antibiotic for intranasal instillation has the following composition:

Gm.
N-acetylcysteine _____ 3.0
Neomycin sulfate_____ 0.3
Sodium EDTA_____ 0.1

Prepare the above as a concentrate, add a bacteriological preservative and lyophilize. At the time of use the composition is reconstituted with a sufficient quantity of water to bring the solution to a total volume of 100 milliliters.

Examples 16, 17 and 18

N-propionylcysteine, N-caproylcysteine or DL-N-acetyl-beta-mercaptoisoleucine may be substituted for N-acetylcysteine in Example 15.

Example 19

A composition containing an anti-inflammatory agent for intranasal instillation has the following composition:

N-acetylcysteine _____gm__ 3.0
Prednisolone-21-phosphate _____gm__ 0.1
Sodium EDTA_____gm__ 0.1
Distilled water q.s. ad_____ml__ 100.0
Sodium hydroxide in an amount to impart pH 6.5 to the solution.

Example 20

A suitable solution for vaginal application either by swab or nitrogen-propelled spray has the following composition:

N-acetylcysteine _____gm__ 3.0
Sodium EDTA_____gm__ 0.1
Distilled water q.s. ad_____ml__ 100.0
Sodium hydroxide in an amount to impart pH 6.5 to the solution.

Examples 21 and 22

N-benzoyl-L-cysteine or N-acetyl-DL-penicillamine may be substituted for N-acetylcysteine in Example 20.

Example 23

An effervescent vaginal insert tablet having the following composition per tablet is as follows:

N-acetylcysteine _____mg__ 100.0
Cetylpyridinium chloride_____mg__ 4.0
Tyrothricin _____mg__ 5.0
Sodium bicarbonate_____mg__ 50.0
Sodium EDTA_____mg__ 1.0
Lactose (powdered) q.s._____gm__ 1.0

Example 24

N-propionylcysteine may be substituted for N-acetylcysteine in Example 23.

Example 25

A powder for preparing a vaginal cleansing solution has the following composition in grams for each four grams of powder:

Gm.
N-acetylcysteine _____ 1.0
Sodium bicarbonate_____ 0.75
Tyrothricin _____ 0.015
Cetylpyridinium chloride_____ 0.010
Sodium EDTA_____ 0.020
Lactose (powder) q.s._____ 4.0

As a vaginal cleansing agent, dissolve four grams of the above composition in 1000 milliliters of water and use as a douche.

Example 26

N-propionylcysteine may be substituted for N-acetylcysteine in Example 25.

In the case of aqueous solutions, the concentration of the active N-acylated compound therein is preferably between about 0.05 and 25 percent by weight. Also, the aqueous solution prepared for administration should have a pH between about 4 and about 9 and the pH is adjusted as desired by the use of a suitable alkaline-reacting material.

In the foregoing description, particular reference has been made to the treatment of the respiratory and vaginal tracts in order to effect the desired decongestion by the above defined compounds. However, it will be apparent that they may be used for the treatment of the mucous membranes in animals in other types of disorders, such as various topical ulcerations accompanied by mucopurulent discharge, such as occur in bedsores and draining sinuses, debridement, and otitis media serosa.

This application is a continuation-in-part of my application Serial No. 832,158, filed August 7, 1959, now abandoned.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A mucolytic process which includes the step of contacting animal mucus with an N-acylated sulfhydryl compound having the formula

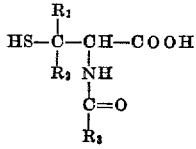

wherein $R_1$ and $R_2$ are each selected from the group consisting of hydrogen and lower alkyl and $R_3$ is selected from the group consisting of lower alkyl and phenyl.

2. The process recited in claim 1 in which said compound is contacted with said mucus in the form of a composition having a pH between about 4 and about 9.

3. A mucolytic process which includes the step of contacting animal mucus with N-acetylcysteine.

4. A decongesting process which comprises contacting mucus on a mucous membrane in an animal with an N-acylated sulfhydryl compound having the formula

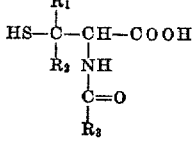

wherein $R_1$ and $R_2$ are each selected from the group consisting of hydrogen and lower alkyl and $R_3$ is selected from the group consisting of lower alkyl and phenyl.

5. A decongesting process which comprises contacting mucus on a mucous membrane in an animal with N-acetylcysteine.

6. A process for decongesting the respiratory tract of an animal which comprises introducing into said tract and into contact with the mucus therein, N-acetylcysteine.

7. The process of claim 6 wherein said N-acetylcysteine is introduced in the form of an aqueous solution.

8. The process of claim 6 wherein said N-acetylcysteine is introduced in the form of an aerosol.

9. A process for decongesting the mucous membrane in the vaginal tract of an animal which comprises contacting the mucus therein with N-acetylcysteine.

10. A therapeutic composition comprising a pharmaceutical carrier, sodium ethylenediamine tetraacetic acid and an N-acylated sulfhydryl compound having the formula

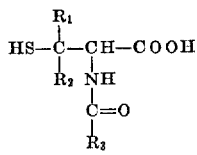

wherein $R_1$ and $R_2$ are each selected from the group consisting of hydrogen and lower alkyl and $R_3$ is selected from the group consisting of lower alkyl and phenyl.

11. A therapeutic composition comprising N-acetylcysteine, sodium ethylenediamine tetraacetic acid and a pharmaceutical carrier.

12. A therapeutic solution comprising water having dissolved therein between about 0.05 and 25 percent by weight of N-acetylcysteine and sodium ethylenediamine tetraacetic acid in an amount from about 0.002 to 1.1 percent by weight.

References Cited in the file of this patent

UNITED STATES PATENTS

| | | |
|---|---|---|
| 2,283,817 | Martin et al. | May 19, 1942 |
| 2,666,012 | Ferguson | Jan. 12, 1954 |
| 2,666,013 | Ferguson | Jan. 12, 1954 |
| 2,796,378 | Ferguson | June 18, 1957 |
| 2,888,380 | Browne et al. | May 26, 1959 |
| 2,904,468 | Davis et al. | Sept. 15, 1959 |
| 2,937,974 | Ferguson | May 24, 1960 |
| 3,014,026 | Kroll et al. | Dec. 19, 1961 |
| 3,016,334 | Lewis | Jan. 9, 1962 |
| 3,061,512 | Anderson et al. | Oct. 30, 1962 |

OTHER REFERENCES

Pirie et al., Biochemical J., vol. 27, 1933, pp. 1716–1718.

Van Scott et al., Arch. of Dermatology and Syphilology, 70:2, 1954, pp. 141–154.

Edwards, Biochemical J., 57:4, 1954, pp. 542–7.

Kawasaki, Chem. Abst., vol. 50, 1956, col. 2550, 1 p.

UNITED STATES PATENT OFFICE
CERTIFICATE OF CORRECTION

Patent No. 3,091,569　　　　　　　　　　　　　May 28, 1963

Aaron Leonard Sheffner

It is hereby certified that error appears in the above numbered patent requiring correction and that the said Letters Patent should read as corrected below.

Column 2, line 17, for "(monohydrate" read -- (monohydrate) --; line 31, for "eluated" read -- eluted --; line 35, for "75-80°" read -- 75-85° --; column 5, line 2, for "installation" read -- instillation --.

Signed and sealed this 3rd day of December 1963.

(SEAL)
Attest:
ERNEST W. SWIDER

Attesting Officer

EDWIN L. REYNOLDS

Acting Commissioner of Patents